US006270105B1

(12) United States Patent
Friedrich

(10) Patent No.: US 6,270,105 B1
(45) Date of Patent: Aug. 7, 2001

(54) METHOD OF WHEELCHAIR CONSTRUCTION

(75) Inventor: Paul Friedrich, Ventura, CA (US)

(73) Assignee: DA International, Ltd., Hewitt, NY (US)

(*) Notice: Subject to any disclaimer, the term of this patent is extended or adjusted under 35 U.S.C. 154(b) by 0 days.

(21) Appl. No.: 09/442,059

(22) Filed: Nov. 16, 1999

(51) Int. Cl.[7] .......... B62K 1/00
(52) U.S. Cl. .......... 280/281.1
(58) Field of Search .......... 280/281.1, 250.1, 280/287, 304; 403/DIG. 9

(56) References Cited

U.S. PATENT DOCUMENTS

| | | | |
|---|---|---|---|
| D. 344,702 | 3/1994 | Robertson et al. . | |
| 3,584,890 | 6/1971 | Presty . | |
| 4,405,142 | 9/1983 | Whetstine . | |
| 4,595,212 | 6/1986 | Haury et al. . | |
| 4,650,201 | 3/1987 | Hartwell . | |
| 4,682,783 | 7/1987 | Kuschall . | |
| 4,684,171 | 8/1987 | Roy et al. . | |
| 4,981,305 | 1/1991 | Lockard et al. . | |
| 5,011,175 | 4/1991 | Nicholson et al. . | |
| 5,253,888 | 10/1993 | Friedrich . | |
| 5,294,141 | 3/1994 | Mentessi et al. . | |
| 5,421,598 | 6/1995 | Robertson et al. . | |
| 5,560,635 | 10/1996 | Robertson et al. . | |
| 5,609,348 | 3/1997 | Galumbeck . | |
| 5,667,235 | 9/1997 | Pearce et al. . | |
| 5,727,802 | 3/1998 | Garven, Jr. et al. . | |
| 5,743,545 | 4/1998 | Kunze et al. . | |
| 5,984,334 * | 11/1999 | Dugas | 280/250.1 |
| 6,050,582 * | 4/2000 | Horacek | 280/250.1 |

* cited by examiner

*Primary Examiner*—Robert J. Oberleitner
*Assistant Examiner*—C. T. Bartz
(74) *Attorney, Agent, or Firm*—Lackenbach Siegel Marzullo Aronson & Greenspan, P.C.

(57) ABSTRACT

A method of constructing a wheelchair that is durable, lightweight, economical and fully adaptable to any end user's requirements, such as sizing, convertibility, environment and lifestyle, and the resulting wheelchair, is disclosed, made possible by the utilization of specially designed weld-free connector fittings with any desirable or available tubular materials.

3 Claims, 12 Drawing Sheets

SIDE VIEW

REAR VIEW

SIDE VIEW

TOP VIEW
(SEAT UPHOLSTERY REMOVED FOR CLARITY)

REAR VIEW

SIDE VIEW
(WITH OPTIONAL FOLDING BACK)

TOP VIEW
(SEAT UPHOLSTERY REMOVED FOR CLARITY)

METHOD OF WHEELCHAIR CONSTRUCTION

BACKGROUND OF INVENTION

1. Field of the Invention

The invention generally relates to wheelchairs, and more specifically to a method of wheelchair construction and resulting wheelchair.

2. Description of the Prior Art

There are two commonly used wheelchair design—the crossbrace folding wheelchair and the welded rigid frame wheelchair. The typical method of construction for both types of wheelchairs is to weld or braze metal tubes together to form frames and folding members. Unfortunately, the two above-described designs have one major flaw in common—the strength inconsistencies of the welded joints. Breakage of welded or brazed joints is the main cause for structural failure in wheelchairs. Welding or brazing also creates a heat-affected zone weakening the frame tube around the welded or brazed joints and making repairs in most cases impossible. Repairs and maintenance of these wheelchairs are costly and require elaborate service infrastructure. In addition, the welded construction makes it extremely difficult, if not impossible, to adapt the wheelchair to the end user's changing needs and environment. Conversion from rigid frame to a folding wheelchair is also virtually impossible.

It is desirable to have a wheelchair design constructed without welds or brazes. A weld-free wheelchair design would eliminate the shortcomings described above and open the door to endless new design possibilities.

Some wheelchair manufacturers build each of the wheelchair types listed above but they are of dedicated, welded construction and, for the aforementioned reasons, do not adapt from one type to another. There are chairs that are modular in design and can change the widths of the wheelchair with little difficulty. There is a design that converts from a user propelled to an assistant propelled wheelchair (U.S. Pat. No. 5,294,141). There is also a wheelchair that converts the riding position from the standard seating position to a recumbent position (U.S. Pat. No. 5,011,175). There is a weld-free folding wheelchair that folds in a non-conventional manner but is not modular (U.S. Pat. No. 4,682,783). Another wheelchair design appears to be a weld-free design that allows the wheelchair to adjust to different needs by use of special shaped bars and plates but is limited to width and depth adjustment (U.S. Pat. No. 5,743,545). There are several U.S. patents that claim to be modular, allowing for different components to be used to build the chair to the user's needs. Among these is a rigid frame wheelchair (U.S. Pat. No. 5,421,598), but again this wheelchair does not convert or adapt to the extent of this invention. There are several U.S. patents for wheelchairs that have welded or brazed construction.

In U.S. Pat. No. 5,253,888, issued to the assignee of the subject invention, a rigid frame weld-free wheelchair is disclosed that utilizes a series of special clamps for clamping tubes to each other. However, such weld-free construction has some disadvantages. A series of specially designed clamps had to be utilized which were not universal to all designs, making further design changes virtually impossible. Also, by virtue of the clamp designs, numerous bolts were required that were clearly visible and detracted from the appearance of the wheelchair.

There are no wheelchairs known to exist at this time that are constructed with distortion-free connectors and that can be configured or adapted to the extent of this design.

SUMMARY OF THE INVENTION

An object of the invention is to provide a method of wheelchair construction and resulting wheelchair that do not have the disadvantages inherent in the comparable prior art.

It is another object of the invention is to provide a lightweight and economical wheelchair that can quickly and easily be sized, adapted or converted. The weld-free construction allows for considerable increase in strength and durability and minimal maintenance.

It is another object of the invention to provide a modular construction wheelchair that can be quickly and easily converted from rigid frame to folding, to sports, to companion chair, etc.

It is another object of this invention to provide a wheelchair that has the ability to adapt to virtually any configuration or option required by the wheelchair user.

It is yet another object of this invention to provide a wheelchair that can be constructed of non-specific tubular materials (steel, aluminum, stainless steel, titanium) and connector fittings which allows to adapt the wheelchair to any environment.

It is another object of this invention to provide a wheelchair built with standardized components which allows it to be shipped in parts and be assembled and customized locally by an unskilled person using simple tools.

The resulting wheelchair has a pair of like side frame assemblies spaced from each other and each including a generally horizontal seat tube and a generally horizontal bottom tube below the seat tube. Each of the seat and bottom tubes have front and rear ends. The wheelchair also has a generally vertical backrest tube having a lower end proximate to the rear ends of the seat and bottom tubes and an upper end that extend upwardly of the seat tube and form handgrips. The wheelchair has a caster assembly for each side frame assembly carrying a caster wheel and having a generally upwardly extending shaft portion, at least one failsafe weld-free means for each of the frame assemblies rigidly connecting at least two tubes of the wheelchair to each other and transverse connecting means for extending between and connecting said side frame assemblies to each other.

This wheelchair also has footrest supports secured to said seat tube and rear wheels mounted on the side frame assemblies.

The typical wheelchair frame is made up of left and right side frame assemblies, two push handle assemblies, upholstery and removable folding or rigid crossbars. There are specially designed failsafe weld-free connector fittings that are used to provide for a secure fastening internally between mating tubes. These fittings are used throughout all assemblies where two or more tubes mate up. These fittings shall be referred to as connector fittings throughout this text. Each side frame assembly is provided with mounting holes to assemble the wheelchair as either folding or rigid. The folding crossbar assemblies have T-type fittings at the lower end which are a sliding fit to the lower side frame assembly tubes. At the top of the crossbars are seat tubes held in place perpendicular to the crossbar by the connector fittings. Each seat tube is assembled with a multi position insert that is used to attach the seat tube to the crossbar and to assemble the seat upholstery. There are holes in the crossbars near the center. These holes are the location where a pair of crossbars are bolted together and act as the pivot point when folding. These crossbars are slid onto the lower frame tube and held in place with retaining rings fastened through holes in the tube. This maintains proper horizontal position. There are also holes near the top of the crossbars that are fastened to links that pivot on the side frame assemblies. The links hold the wheelchair frame assemblies parallel when the chair is in both the open (riding) and folding (storage) positions. When the wheelchair is in the open (riding) position, the seat tubes nest into saddles fastened to each side frame assembly. This nesting along with the tension of the upholstery creates a solid box frame giving the chair the feel and performance associated with rigid frame wheelchairs.

Rigid frame type wheelchair use different cross tubes and back assembly. The rigid frame does not use the folding crossbars, links, and retaining rings which are specific to the folding wheelchair. There are two types of rigid crossbars. The lower crossbars are straight tubes. The upper crossbars have a bend at both ends to give clearance at the seat and back upholstery. Each of the rigid crossbars is assembled with the connector fittings. The same seat inserts in the folding design are inserted into the upper frame tubes of the side frame assemblies. The top rigid cross tubes are assembled to each side frame at the appropriate holes with the connector fittings. Inserts are placed into the lower side frame tubes and the lower crossbars are fastened in place.

The backrest of the wheelchair may be adjusted to varying heights as may be required by the user or to a folding back for the rigid frame version for ease of transportation and storage. Each side frame has an insert in the back at the seat level that is used to fasten the backrest tubes to the frame. Changing heights can be done by removing two fasteners on either side and the back upholstery and replacing with the new backrest tubes and upholstery. To replace the fixed back with a folding back, the back insert is replaced in the frame with the proper insert for folding. The backrest tube is assembled to the folding hinge plates and all to the frame assemblies are assembled. A reclining back assembly can also be assembled in place of the standard straight back or folding back assemblies. All components are modular allowing for simple alteration of the seat width and depth and back height.

BRIEF DESCRIPTION OF THE DRAWINGS

The benefits of the construction herein disclosed will become apparent to those skilled in the art from the following detailed description of a presently preferred embodiment, having reference to accompanying drawings wherein.

DESCRIPTION OF PREFERRED EMBODIMENT

Figure 1:
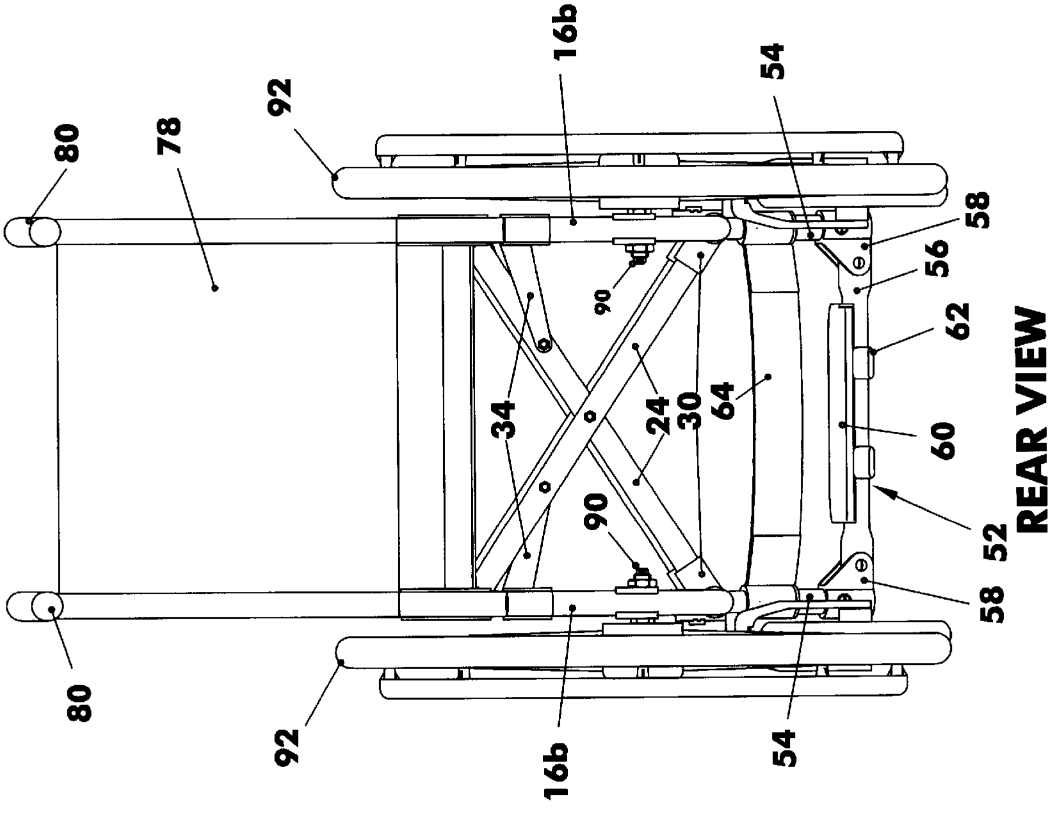
FIG. 1 is a rear elevation view of a wheelchair assembled with folding crossbars with the failsafe weld-free connectors in accordance with the invention.
Figure 2:
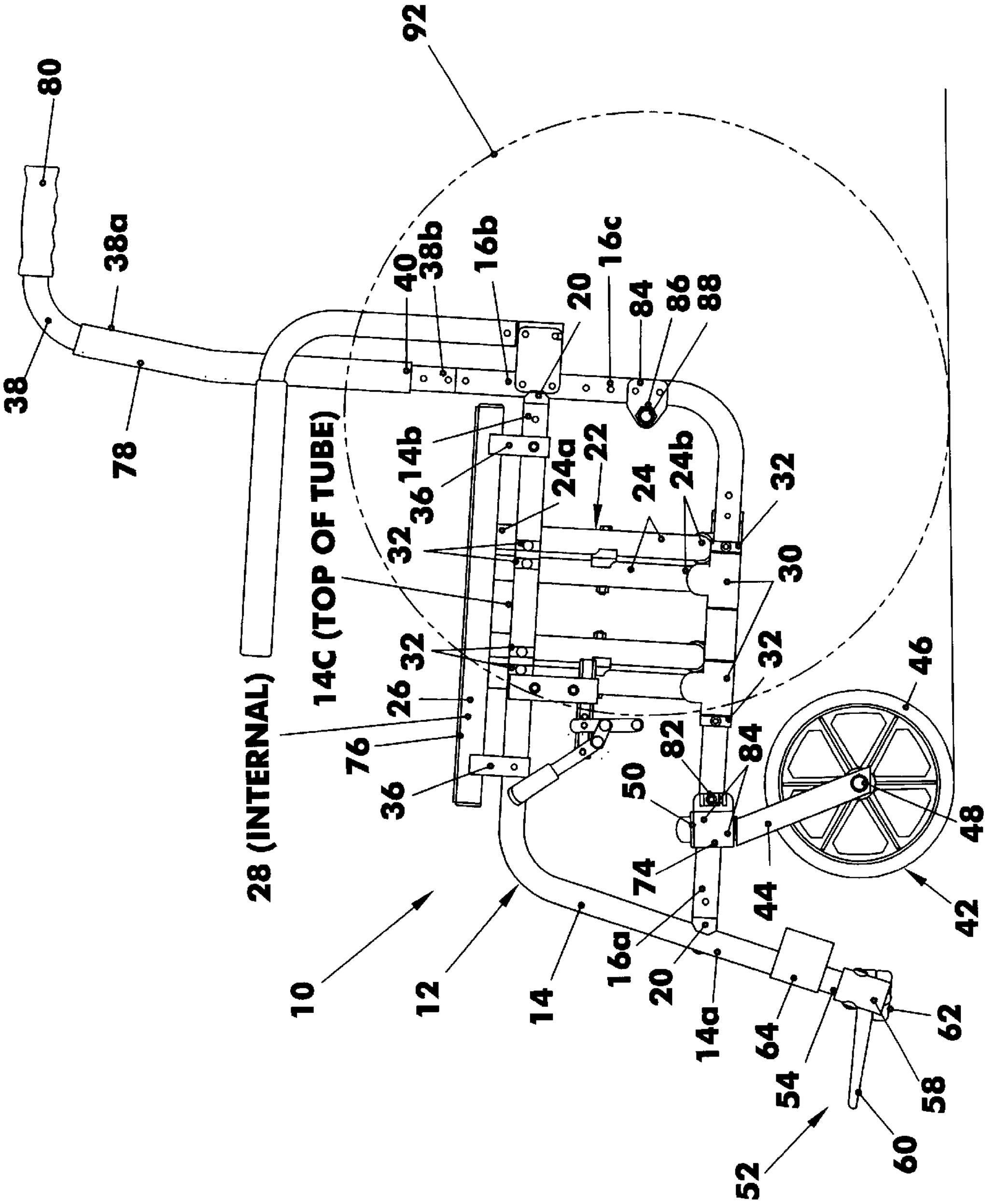
FIG. 2 is a side elevation view of the wheelchair shown in FIG. 1 with folding crossbars, shown with rear wheels removed.
Figure 3:
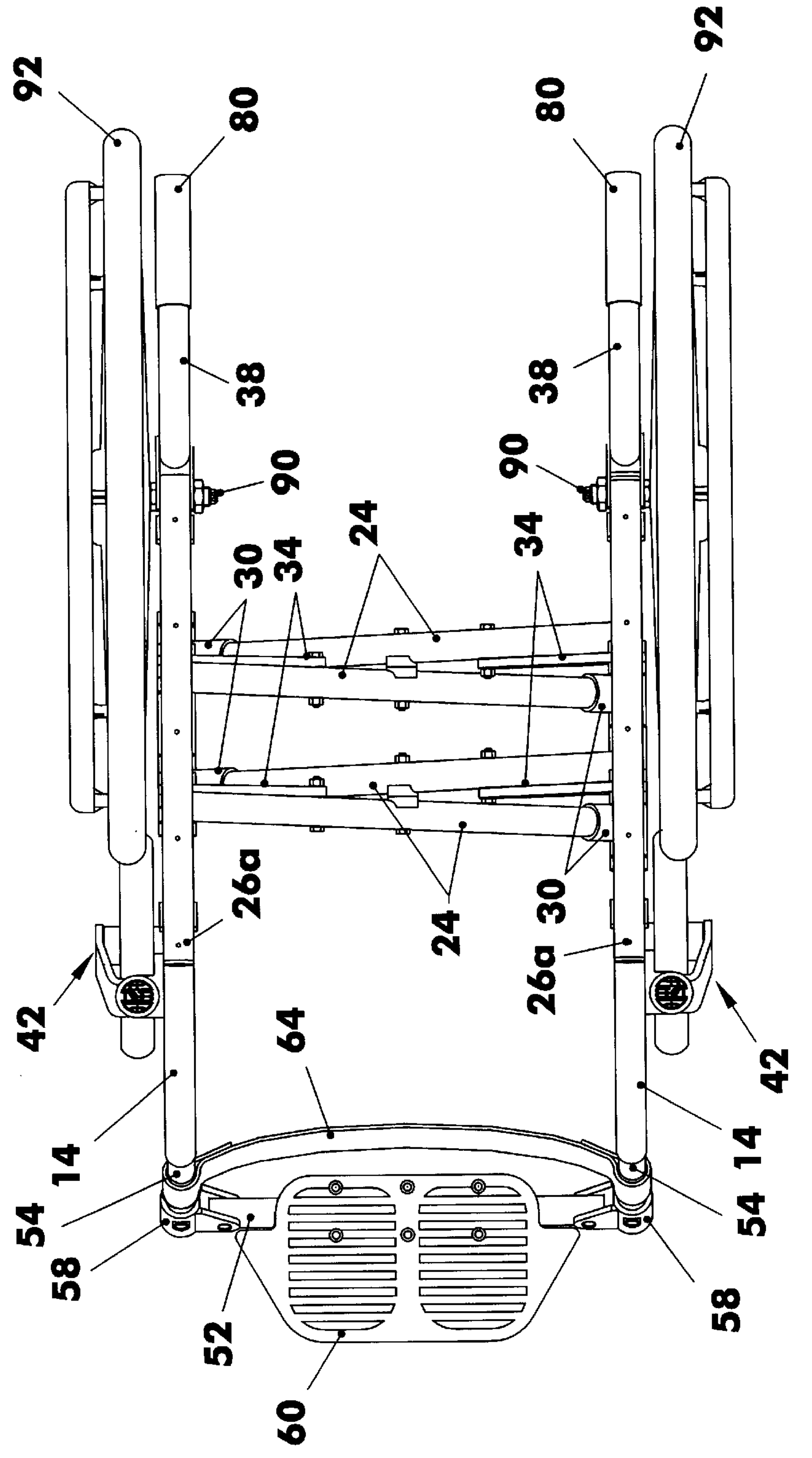
FIG. 3 is a top plan view of the wheelchair shown in FIGS. 1 and 2, with folding crossbars (upholstery removed for clarity)

Referring now to the figures, in which identical or similar parts are designated by the same reference numerals throughout, and first referring to FIGS. 1, 2 and 3, a folding wheelchair in accordance with the present invention is generally designated by the reference numeral 10.

Figure 7:
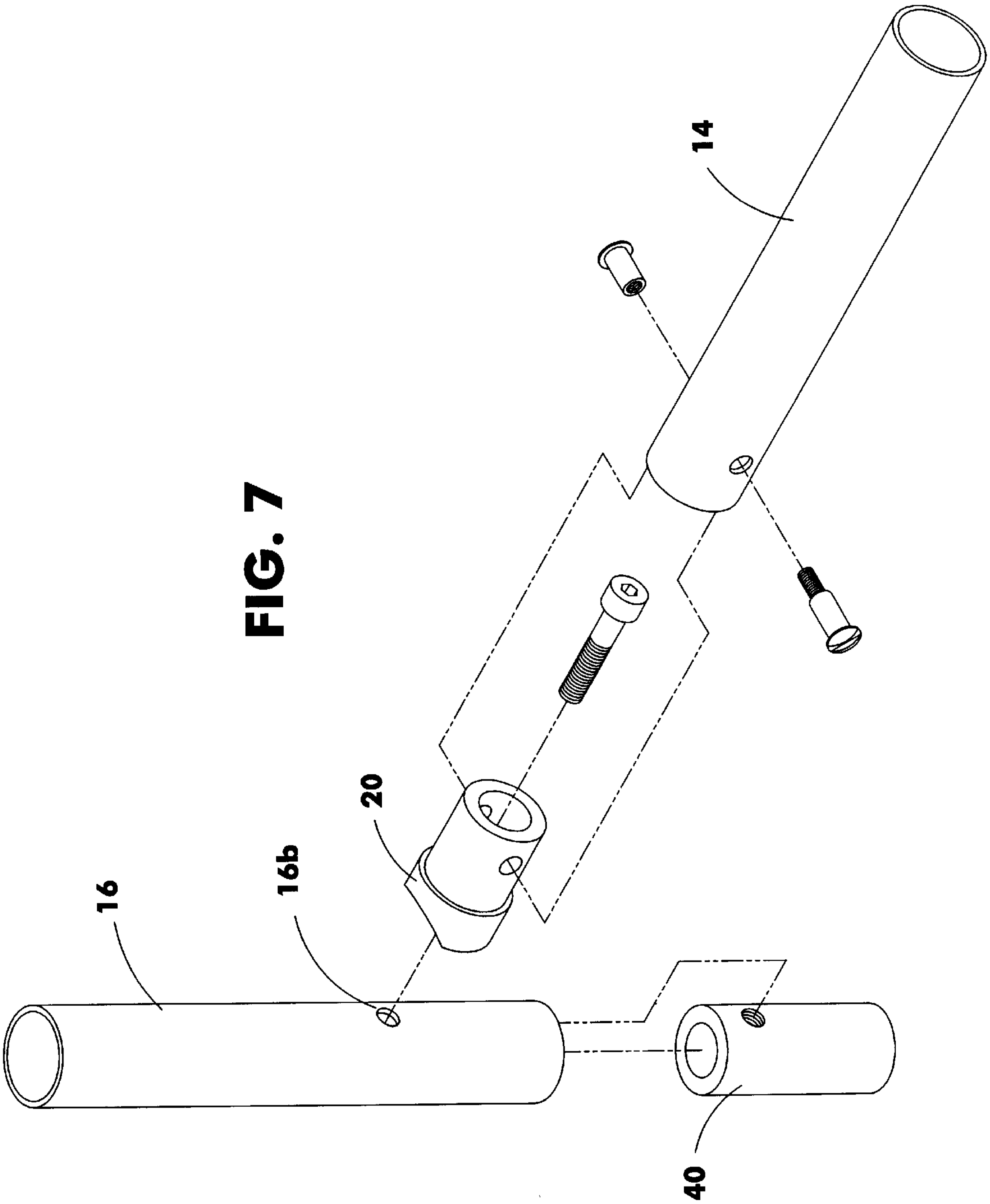
FIG. 7 is a fragmentary, exploded perspective view of the connector fitting used in the wheelchair shown in FIGS. 1–6.

The chair 10 has a pair of like side frame assemblies 12 spaced from each other and including a generally horizontal top tube 14 and a generally horizontal bottom tube 16 below the top tube. The top and bottom tubes have front or distal ends 14*a*, 16*a* and rear or proximal ends 14*b*, 16*b*. An important feature of the invention is that at least one, and usually all, of the tubes that are joined to each other, such as the top and bottom tubes at front ends 14*a*, 16*a*, are joined using connector fittings 20. The details of the connector fittings are best shown in FIG. 7 and are more fully described at pages 5, 10 and 17 in U.S. patent application Ser. No. 09/442,057, filed simultaneously herewith, for "Distortion-Free Weldless Method of Joining Tubular Elements," with the same inventor and assignee as the present application.

The top tube 14 and the bottom tube 16 are secured to each other at front 14*a*, 16*a* and at the rear 14*b*, 16*b* using connector fittings 20. The top tube 14 has a row of holes 14*c* for seat attachment when converted to a rigid frame wheelchair.

The chair also has like crossbar assemblies 22 including angular crossbar tubes 24 and a generally horizontal seat tube 26. There is an insert tube 28 located inside of the seat tube which has threaded holes for multiple connections coinciding with holes in the upper frame 14 and seat tubes 26 which include seat to crossbar and seat upholstery on both the folding and the rigid wheelchair. The seat tube 26 and cross tubes 24 are joined at the upper ends of the cross tube 24*a* that is offset from the center of the seat tube 26. The tubes are attached using connector fittings 20. The lower ends of the crossbar tubes 24*b* are inserted into T-fittings 30 with the through hole parallel to the seat tube 26. Each T-fitting has a sliding fit relative to the lower side frame tube 16. The crossbar assemblies 22 are installed over the lower side frame tube 16 in opposing directions (left side with longer portion of seat tube to rear, right side longer portion to front) with seat upholstery holes 26*a* pointing upward. Each crossbar assembly 22 is held in position by retaining rings 32. Crossbar links 34 are installed over the top frame tube 14 and held in place with retaining rings 32. The hole at the small end of the crossbar links 34 are fastened to the opposing crossbar tube 24 at hole 24*a*. The crossbar links 34 maintain a parallel relationship between side frame assemblies when the wheelchair is in either the open or folded position. Seat tube saddles 36 are also assembled to the top frame tube 14. The seat saddles are a snap fit with the seat tubes 26, when the wheelchair is in the open position the seat tubes rest in the saddles and lock the frame rigidly. The seat upholstery 76 is secured to the seat tube with screws at upholstery holes 26*a*.

Each side frame assembly 12 has a back tube stiffening insert 40 secured near the top of the vertical component of the bottom frame tube end 16*b* and protruding upward. Back upholstery 78 is assembled over a pair of push handle tubes 38 and secured with screws near the top of each push handle tube end 38*a*. Push handles are assembled over the top of the back tube stiffener insert 40 abutting the top of the vertical component of the bottom frame tube 16*b*. The assembly is secured with fastener through holes in each tubular member. Hand grips 80 are installed over the top ends of each push handle tube 38.

A caster assembly is generally designated by the reference numeral 42 and includes a downwardly extending open fork member 44 that receives and supports a caster wheel 46 by means of a transverse axle 48. Extending upwardly from the fork member 44 is a solid shaft portion 50 rotatably supported about its axis in bearings 84, as will be described below.

Figure 10:
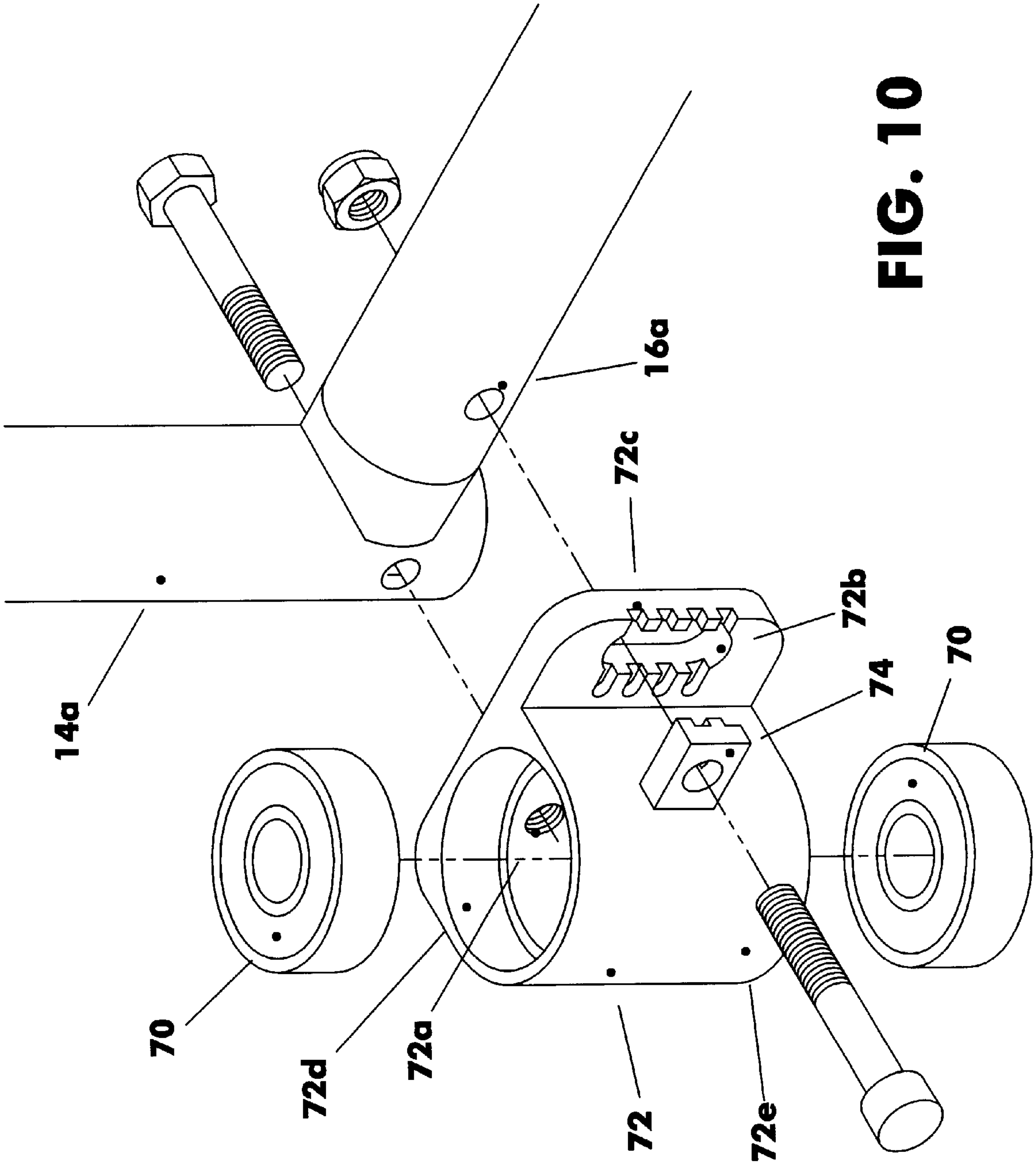
FIG. 10 is a fragmentary exploded perspective view of the caster bearing housing assembly.
Figure 11:
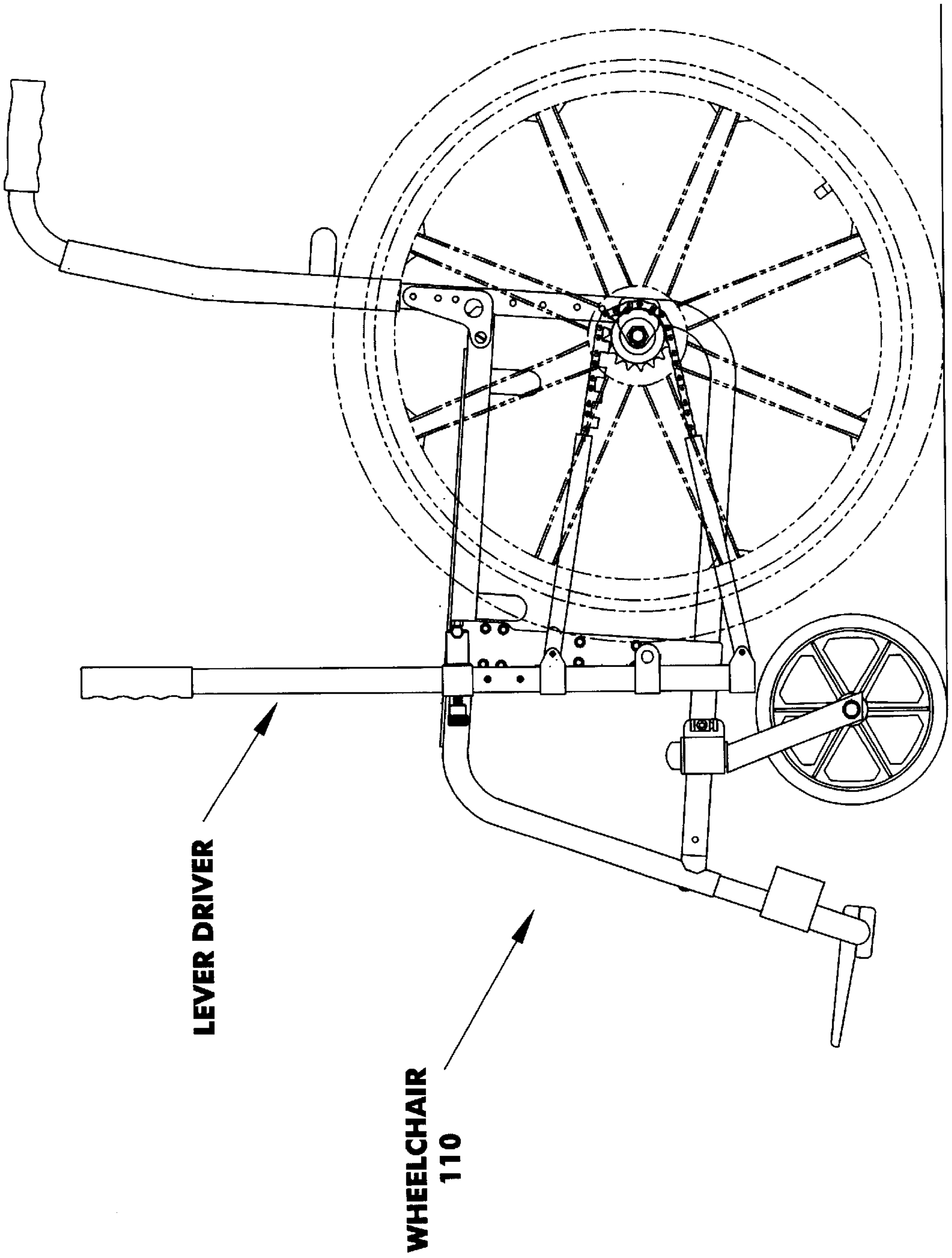
FIG. 11 is a side elevation view of a wheelchair assembled with a lever drive kit.
Figure 12:
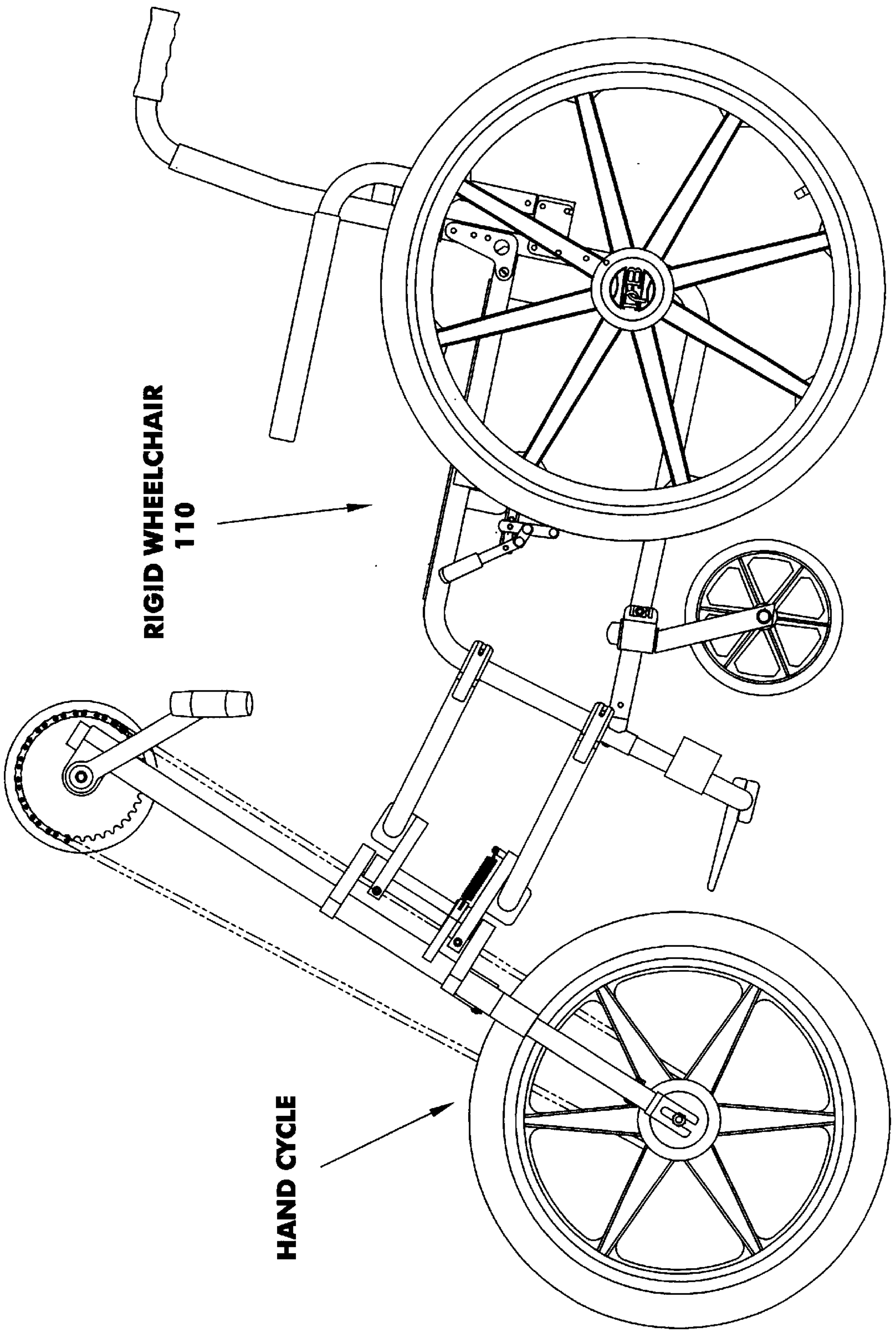
FIG. 12 is a side elevation view of a wheelchair assembled with a hand cycle attachment.

A caster bearing housing 74 (See FIG. 10) is mounted on the bottom frame tube 16 near the front of the tube 14*a*. The caster bearing housing has a threaded hole 74*a* on one end and a slot 74*b* on the opposite side with perpendicular serrations 74*c* crossing the slot. The caster bearing housing is secured to the bottom frame tube. The caster bearing housing 74 is free to rotate vertically about the hole. A mating serrated cam 82 is secured over the slot in the caster bearing housing 74 and when properly placed maintains a vertical posture for the caster fork stem 50. The caster bearing housing 74 has both an upper and lower bearing pocket 74*d*, 74*e* into which radial bearings 84 are pressed.

The vertical solid shaft 50 of the caster assembly 42 is inserted through the bearings 84 pressed into the caster bearing housing 74. The top of the caster stem is threaded to enable securing to the caster bearing housing with a locking nut. The caster assembly 42 is horizontally rotatable about the bearings and stem.

Footrest assembly 52 includes extension tubes 54 that are telescopically received within the front ends 14*a* of the top frame tubes 14, as shown. A transverse tube 56 is secured to one extension tube 54 at its lower end and nests into a fitting 58 on the opposite extension tube. A footrest 60 is secured to the transverse tube 56 (FIGS. 2 and 3) by means of footrest clamps 62. A belt or strap 64 extends between opposing extension tubes 54 and is positioned above the footrest 60 to serve as a foot support and to prevent the legs from slipping rearwardly off the footrest.

Figure 8B:
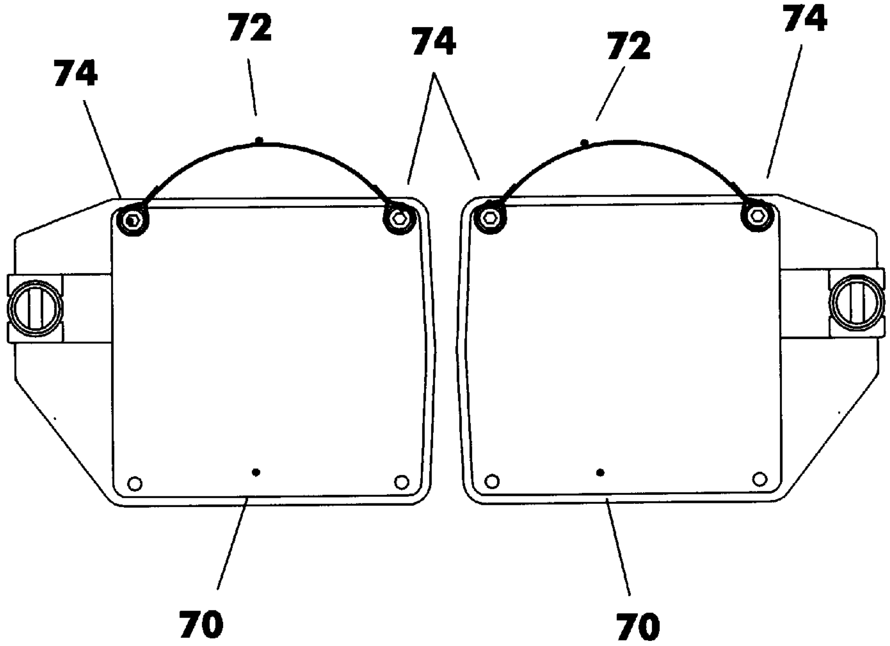
FIGS. 8*a* and 8*b* are side and top elevation views of optional flip up footplate assemblies.
Figure 8A:
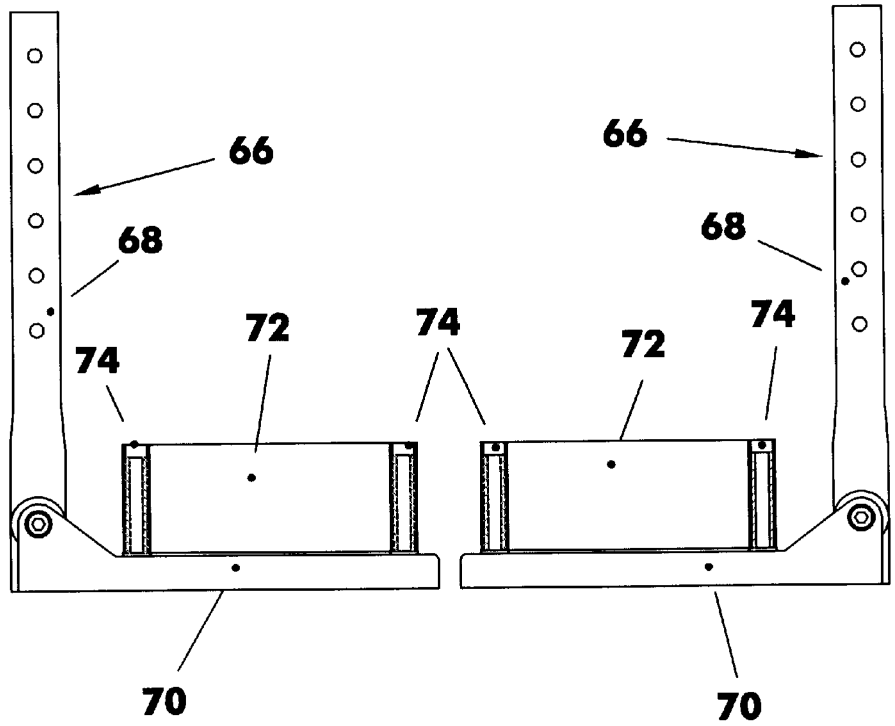

An alternate footrest assembly 66 is shown in FIG. 8. This assembly includes extension tubes 68 that are telescopically received within the front ends 14*a* of the top frame tubes 14, as shown. A flip up footplate 70 is secured to the lower end of the extension tube 68. It is free to rotate upward toward the extension tube. The footplate 70 is limited in rotation downward to a position perpendicular to the extension tube 68. A belt or strap 72 is attached to the inner and outer rear corners of the foot plate 70*a* with a studs 74 (see FIG. 2) and loops around the footrest extension tube 68 positioned above the footplate.

The vertical component of the bottom frame tube 16*c* has a series of holes to which are mounted a pair of rear wheel mounting plates 84 and a wheel plate bushing 86 which is captured between the pair of plates. The position of the axle mounting plates on the bottom frame tube determines the wheelchair rear seat height and seat angle. An axle bushing 88 is installed through the wheel mount plates 84 and wheel plate bushings 86 secured on the back side with a nut. Axles 90 (not shown) support the rear wheels 92 and insert into axle bushing 86. Rear wheels are rotatable vertically about the axles.

Figure 9:
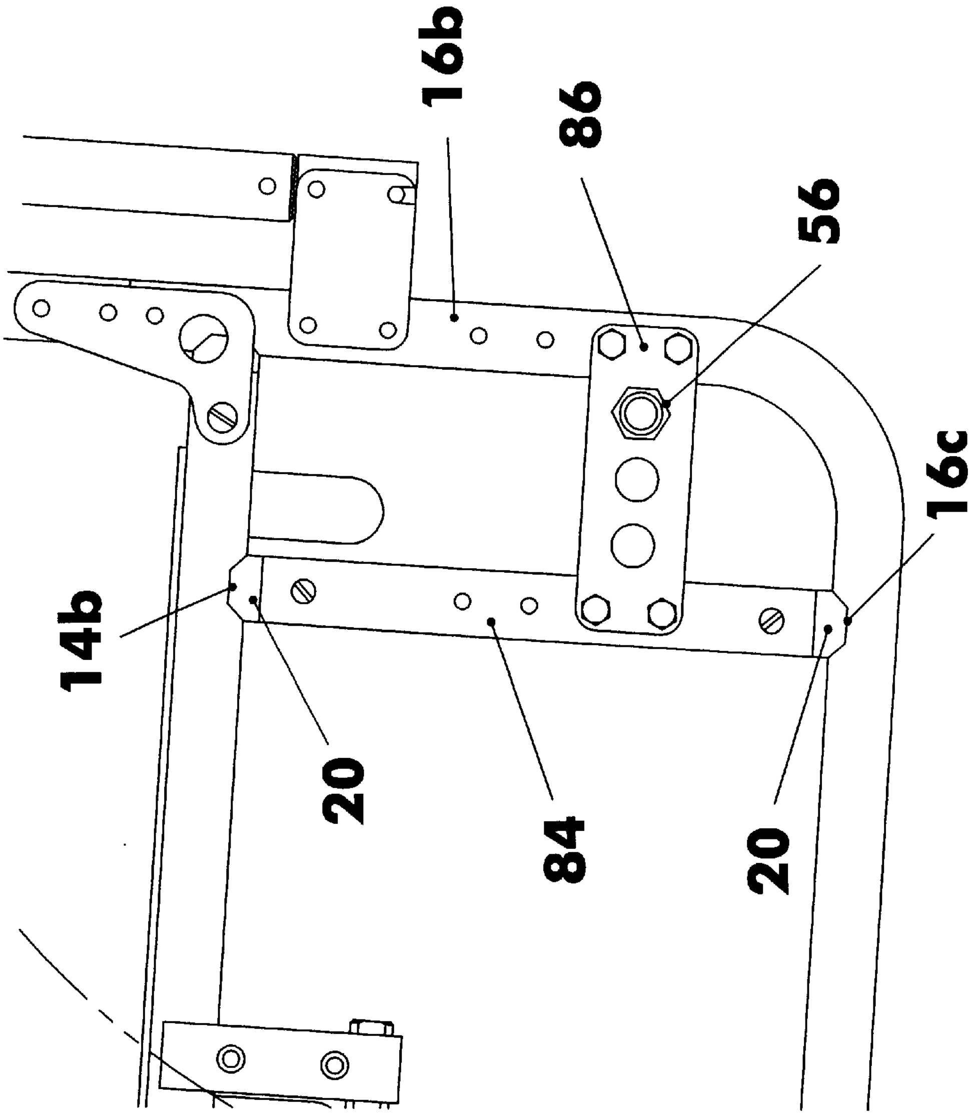
FIG. 9 is an exploded partial side view of a rigid frame wheelchair with optional wheel camber plate.

FIG. 9 shows an optional wheel attachment, which consists of an axle plate tube 94, mounted between the top frame tube 14 and the bottom frame tube 16 at 14*b*, 16*c*. The axle plate tube is secured to the frame tubes with connecting fittings 20 at both ends. Spanning between the axle plate tube 94 and the vertical component of the bottom tube 16 is a generally horizontal axle camber plate 86. The axle camber plate has a series of holes through which the wheel axle bushing 88 is secured. Positioning of the wheel bushing in the holes in the axle camber plate 86 determine the center of gravity of the wheelchair. Angling the lower edge of the axle camber plate 86 outward creates camber to the rear wheels which aids in stability and performance.

Figure 4:
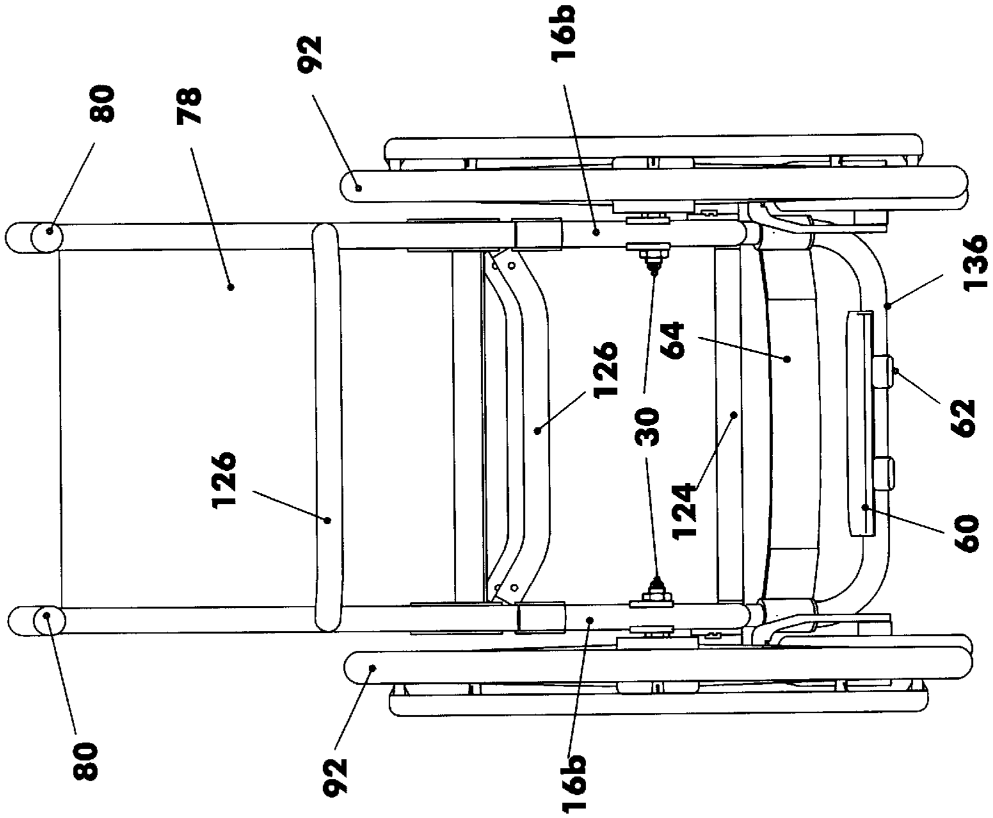
FIG. 4 is a rear elevation view of the wheelchair assembled with rigid cross tubes.
Figure 5:
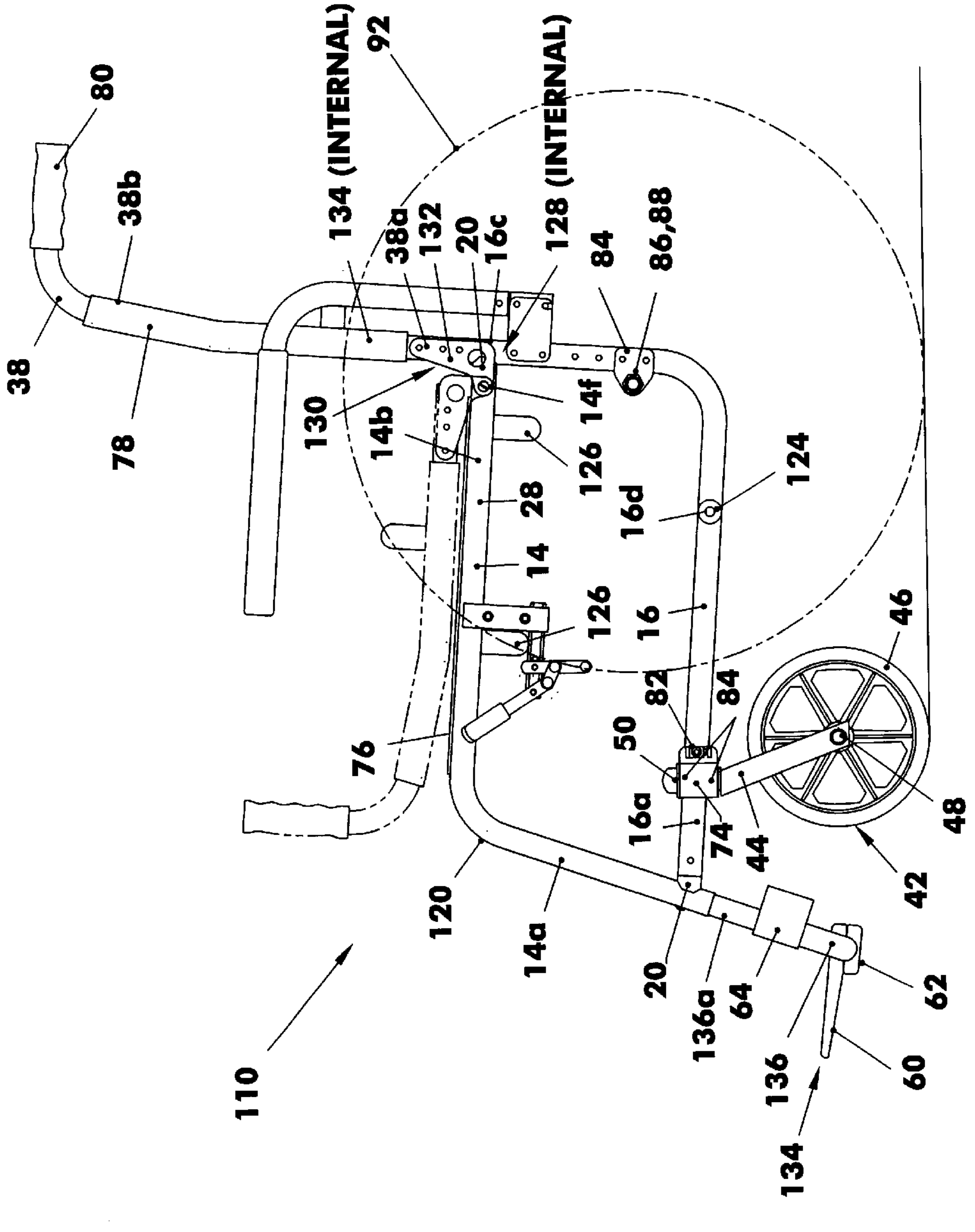
FIG. 5 is a side elevation view of the wheelchair shown in FIG. 4 assembled with rigid cross tubes (upholstery removed for clarity)
Figure 6:
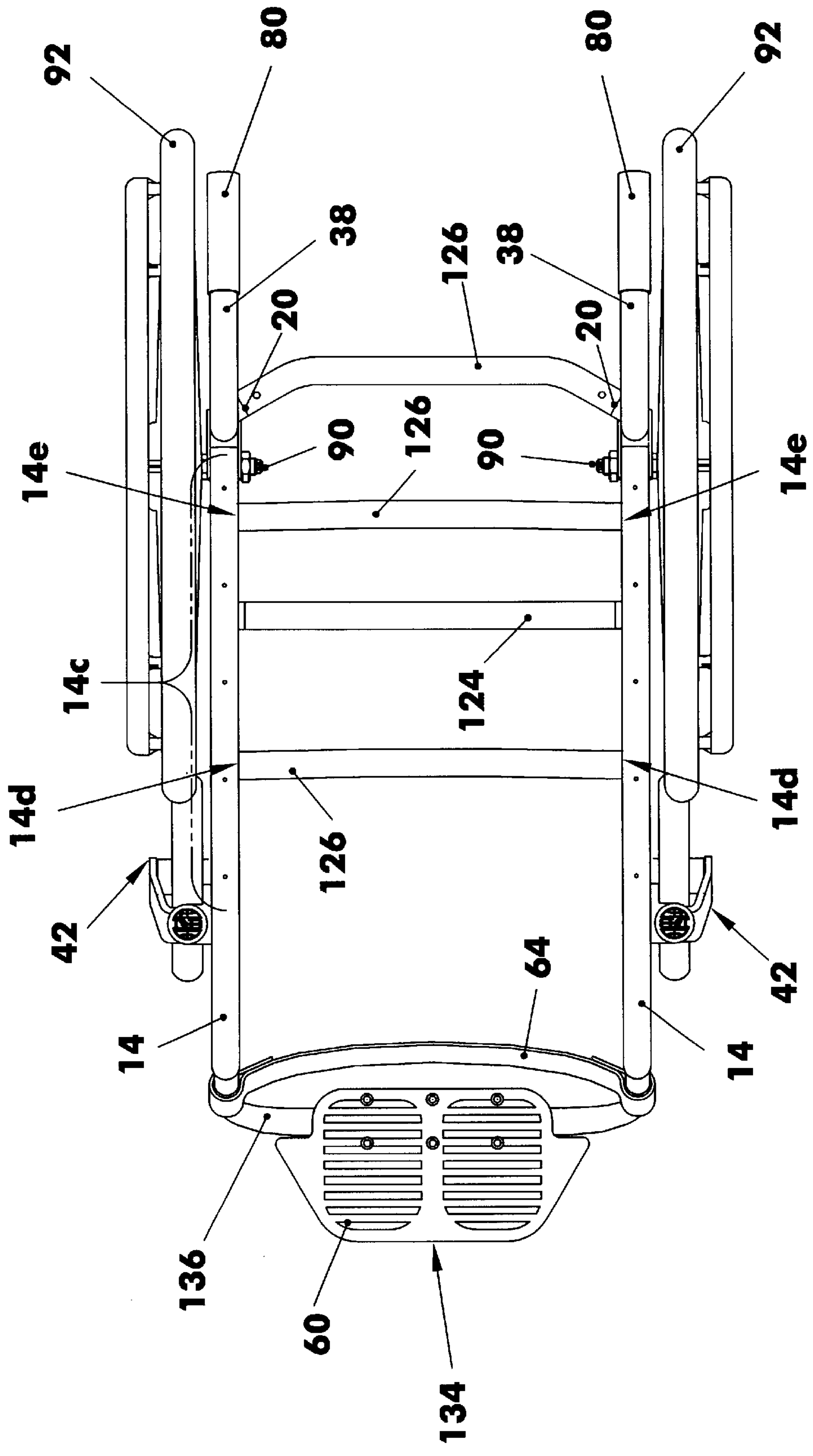
FIG. 6 is a top plan view of the wheelchair shown in FIGS. 4 and 5 assembled with rigid cross tubes (upholstery removed for clarity)

Now referring to FIGS. 4, 5 and 6, a rigid wheelchair in accordance with the present invention is generally designated by the reference 110.

The wheelchair 110 has a pair of like side frame assemblies 120 spaced from each other and including the same components as the previous folding wheelchair side frame assemblies, upper tube 14, lower tube 16 and connector fittings 20.

To convert the folding wheelchair 10 to a rigid wheelchair 110, the following components are removed from the folding wheelchair: seat upholstery 76, crossbar assemblies 22 (including crossbar tubes 24, seat tube 26 and tee fitting 30, see FIGS. 1,2 and 3), crossbar links 34, seat tube saddles 36 and retaining rings 32. The insert tubes 28 in the seat tubes are removed and reinstalled in the top tube 14 of the rigid side frame assemblies 120. The upper frame tubes 14 and lower frame tubes 16 mount to one another with connector fittings 20 at the front at 14*a* and 16*a* and at the rear at 14*b* and 16*c*. This allows the top frame 14 to at the same seat height from the floor as the seat tube 26 on the folding frame wheelchair 10. Threaded inserts 122 are installed into the lower frame tubes 16 at holes 16*d* aligning holes. Straight crossbar tubes 124 are installed at the holes 16*d* and 16*e* with the special connector fittings and screws. Formed cross tubes 126 are installed on the upper frame tubes 14 at 14*d* and 14e using special connector fittings and screws. The insert 28 has corresponding threaded holes to 14*d* and 14*e* to which the formed cross tubes 126 are attached. An additional formed cross tube 126 is attached to the push handle tubes 38 at 38*b* using special fittings 20 and screws.

An optional folding back assembly 130 may be attached to the rigid frame wheelchair 110. The push handle tubes 38*a* are removed from the side frame assembly 120 by removing the screws at 38*a*. The back insert 40 is removed and replaced with a new insert 128. Insert 134 is added to the bottom of each push handle 38 at holes 38*a*. Screws are used to attach back hinge plates 132 to the push handles at 38*a* and to the top frame tube 14 at 14*f*. A removable pin through the hinge plates 132 and the top of the lower frame tube 16*b* at hole 16*f*.

Caster assemblies 42 are the same as used on the folding wheelchair 10.

The footrest assembly 52 or 66 are the same as those used on the folding frame wheelchair 10 or an optional rigid footrest assembly 134 may be used on the rigid frame wheelchair 110. This assembly consists of a generally u-shaped tubular footrest tube 136. Each parallel leg 136*a* and 136*b* of the footrest tube has a series of holes through both walls of the tube. Each of the parallel legs is telescopically received within the front ends 14*a* of the top frame tubes 14, as shown. A footrest 60 is secured to the horizontal potion of the unshaped footrest tube 136 by means of footrest clamps 62. A belt or strap 64 extends between opposing parallel legs of the footrest tube 136 and is positioned above the footrest 60 to serve as a foot support and to prevent the legs from slipping rearwardly off of the footrest.

The above mentioned procedure is to convert a folding wheelchair 10 into a rigid frame wheelchair 110. The reverse procedure would be used to convert rigid to folding.

All frame components are designed to accept parts for both the folding 10 and rigid frame 110 wheelchairs. Tubular components are designed to be easily attached to other members with the special connector fittings 20.

This design offers a simple, lightweight and dependable wheelchair, which can be easily assembled, repaired and maintained by a layman utilizing basic hand tools. The design employs failsafe weld-free connectors to join tubular components.

The elimination of welding and brazing provides the following advantages:

1. Increased strength and durability;
2. Design flexibility: the dimensions of the wheelchair can be easily changed to accommodate the end users' requirements;
3. Modular construction providing for quick conversion from rigid frame to folding, to companion chair, to front wheel drive, to lever drive, to hand cycle, etc.
4. The possibility of using stainless steel, aluminum, titanium, etc., tubing for control of the weight and cost of the wheelchair;
5. The possibility of using noncorrosive materials, warranting a climate proof design;
6. Most of the components are standardized, so the wheelchairs can be shipped in kits and assembled locally; and
7. The wheelchairs can be manufactured locally using various available materials to adapt to rural, suburban or urban environment.

Thus, this wheelchair design:

(a) incorporates tubular connector fittings instead of welded or brazed joints for added structural strength and durability;

(b) uses tube connector fittings with an internal fastener captured within the fitting by a second fastener creating a failsafe mechanism;

(c) uses weld-free tube connectors that allow for the utilization of various hard-to-weld materials such as stainless steel, aluminum, titanium, etc.;

(d) has standardized components allowing for modular construction, ease of assembly, repair, maintenance, convertibility, shipping and storage; and (e) is constructed with the ability to adapt to virtually any environment, configuration or option required by the wheelchair user.

While this invention has been described in detail with particular reference to preferred embodiments thereof, it will be understood that variations and modifications will be effected within the spirit and scope of the invention as described herein and as defined in the appended claims. Thus, while multiple connector fittings have been used to construct the wheelchair in conjunction with the presently preferred embodiment it should be clear that other methods of joining tubes in a wheelchair can also be used in conjunction with the use of one or more connector fittings of the invention.

What is claimed is:

1. A wheelchair comprising:

(a) a pair of like side frame assemblies spaced from each other and each including a generally horizontal seat tube; a generally horizontal bottom tube below said seat tube, each of said seat and bottom tubes having front and rear ends; and a generally vertical backrest tube having a lower end proximate to said rear ends of said seat and bottom tubes and an upper end extending upwardly of said seat tube and forming handgrips;

(b) a caster assembly for each side frame assembly carrying a caster wheel and having generally upwardly extending shaft portions;

(c) first failsafe and weld-free connecting means for each of said side frame assemblies for rigidly securing respective rear ends of said seat and bottom tubes and said lower end of said backrest tubes;

(d) second failsafe and weld-free connecting means for each of said side frame assemblies for rigidly connecting respective front ends of said seat and bottom tubes and caster assembly shaft portions;

(e) footrest support means secured to said seat tube;

(f) transverse connecting means for extending between and connecting said side frame assemblies to each other; and (g) third failsafe and weld-free connecting means for rigidly connecting said transverse connecting means to said side frame assemblies, each of said connecting means being used to connect a first elongated cylindrical member defining a first axis and having a substantially uniform cross section defining a predetermined outer surface and a second elongated member which defines a second axis and has at least one tubular end; connector means formed with an axial hole and axial counterbore dimensioned to engage a fastener extending through said axial hole and said first elongated cylindrical member for rigidly retaining said first elongated member only when said fastener is maintained in a tightened condition against said counterbore for interfacing with said predetermined outer surface for detachably connecting one end of said second member to an intermediate portion of said first cylindrical member and preventing rotation of each of said members about their respective axes when assembled and for preventing radial forces from being applied solely to a localized region of at least one outer surface portion of either one of said members: and failsafe means extending through said counterbore for inhibiting axial movement away from said counterbore resulting in loosening and/or disconnection of said one end of said second member from said intermediate portion of said first cylindriclal member.

2. A wheelchair comprising:

(a) a pair of like side frame assemblies spaced from each other and each including a generally horizontal seat tube; a generally horizontal bottom tube below said seat tube, each of said seat and bottom tubes having front and rear ends; and a generally vertical backrest tube having having a lower end proximate to said rear ends of said seat and bottom tubes and an upper end extending upwardly of said seat tube and forming handgrips;

(b) a caster assembly for each side frame assembly carrying a caster wheel and having a generally upwardly extending shaft portion;

(c) first failsafe weld-free connecting means for each of said side frame assemblies for rigidly securing respective rear ends of said seat and bottom tubes and said lower end of said backrest tubes;

(d) second failsafe weld-free connecting means for each of said side frame assemblies for rigidly securing respective front ends of said seat and bottom tubes and caster assembly shaft portion;

(e) footrest support means secured to said seat tube;

(f) a plurality of transverse tube means having ends and extending between said side frame assemblies;

(g) third failsafe weld-free connecting means for rigidly connecting said conversion means to frame assemblies;

(h) rear wheels mounted on said frame assemblies; and (i) pivotally connected elongate means having ends pivotably connectable to said side frame assemblies for selectively replacing said transverse connecting means and for permitting said side frame assemblies to move from the width position of the wheelchair to proximate positions in the collapsed condition of the wheelchair.

3. A wheelchair comprising:

(a) a pair of like side frame assemblies spaced from each other and each including a generally horizontal seat tube; a generally horizontal bottom tube below said seat tube, each of said seat and bottom tubes having front and rear ends; and a general vertical backrest tube having a lower end proximate to said rear ends of said seat and bottom tubes and an upper end extending upwardly of said seat tube and forming handgrips;

(b) a caster assembly for each side frame assembly carrying a caster wheel and having a generally upwardly extending shaft portion;

(c) at least one failsafe weld-free connecting means for each of said frame assemblies for rigidly connecting at least two tubes of the wheelchair to each other, said at least one failsafe weld-free connecting means including a first portion fully received within one of two tubes to be rigidly connected and a second portion secured to another of said two tubes to be rigidly connected, and fastener means for rigidly securing said first and second portions through a wall of said other of said tubes;

(d) transverse connecting means for extending between and connecting said side frame assemblies;

(e) footrest support supports secured to said seat tube; and (f) rear wheels mounted on said side frame assemblies.

* * * * *